United States Patent Office 3,280,288
Patented Oct. 18, 1966

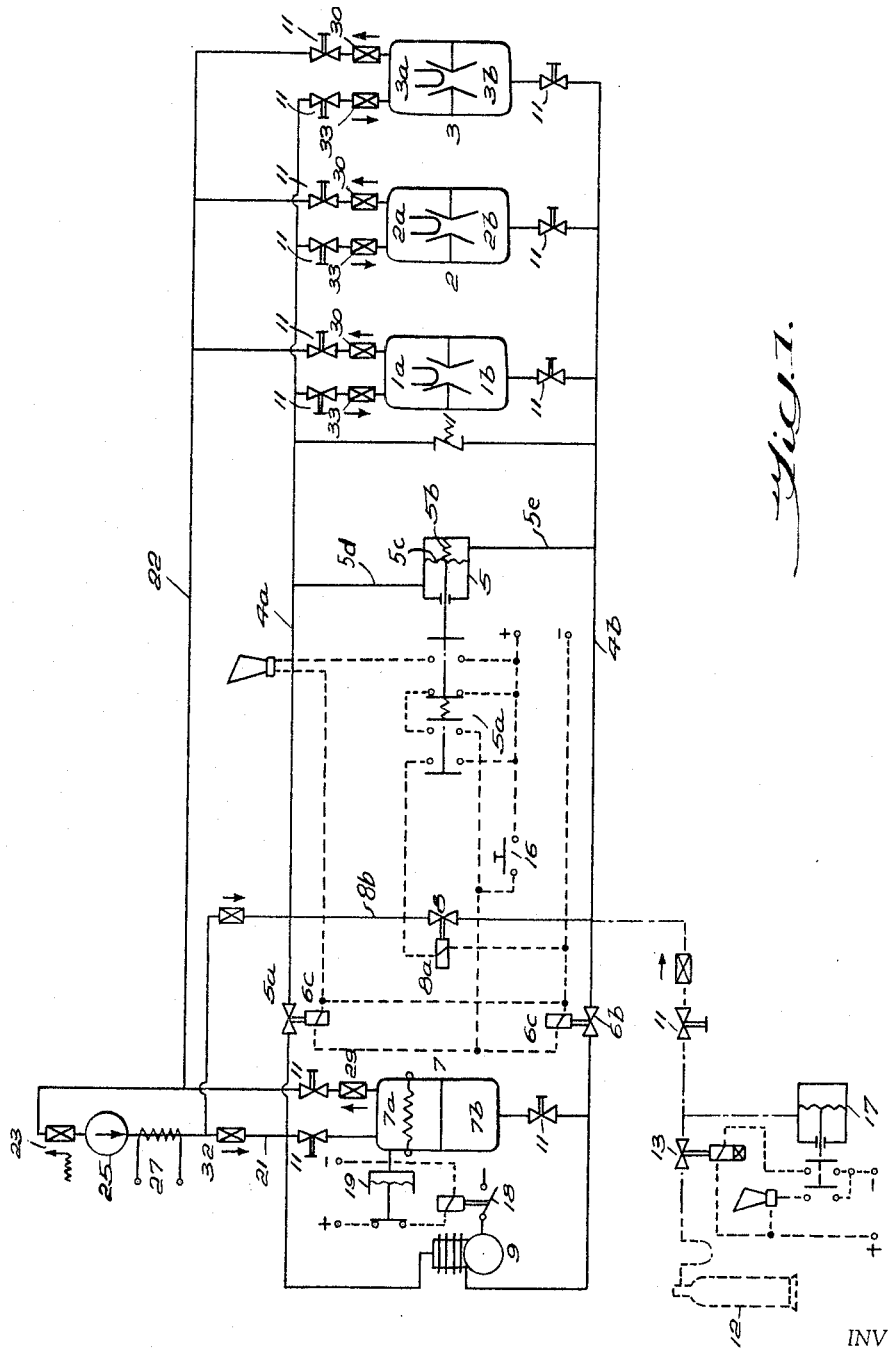

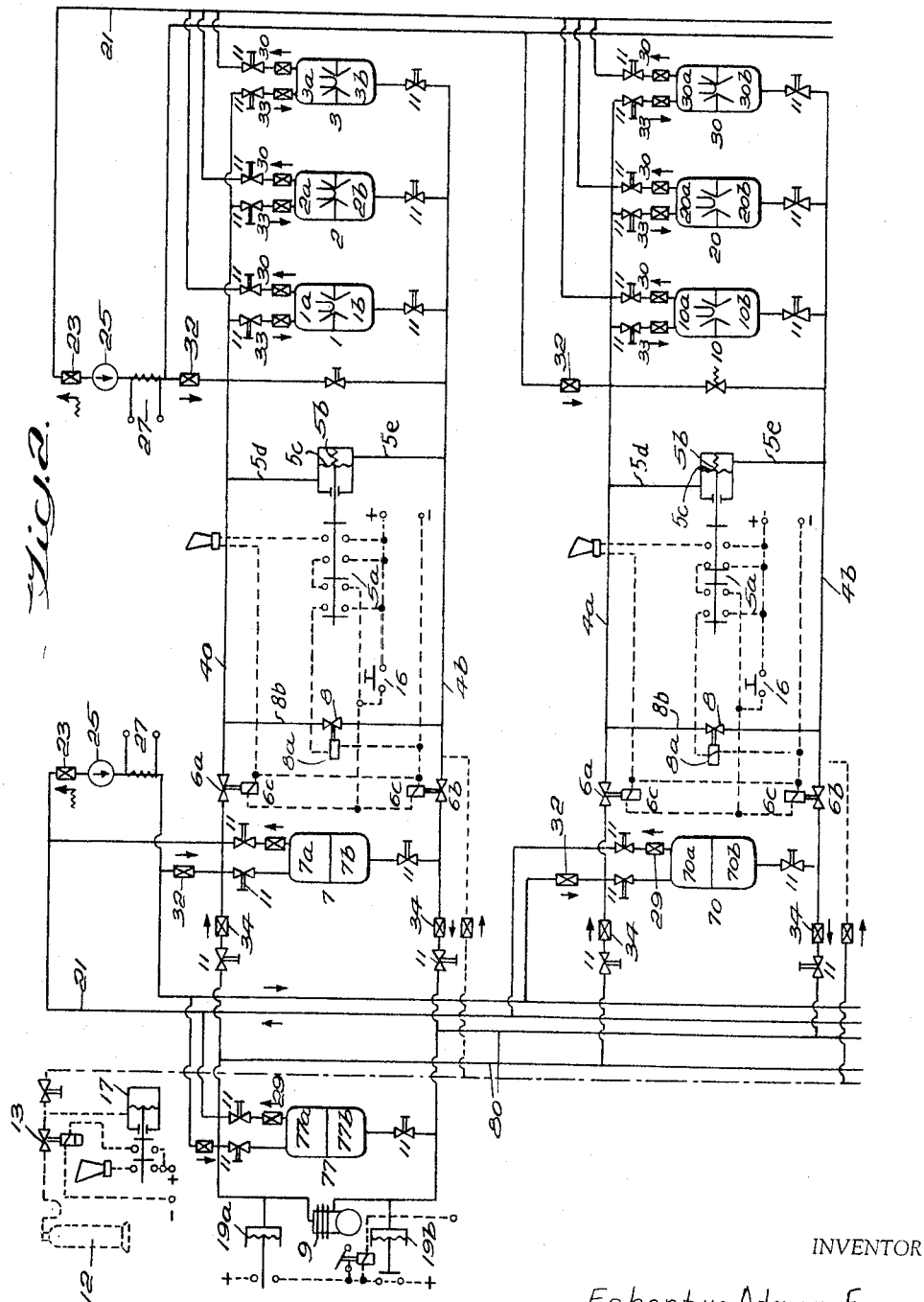

3,280,288
COMPRESSED GAS CIRCUIT BREAKER WITH CLOSED GAS CIRCUIT
Egbertus Adrianus Frowein, Nussbaumen, Aargau, Switzerland, assignor to Aktiengesellschaft Brown, Boveri & Cie, Baden, Switzerland, a joint-stock company of Switzerland
Filed Mar. 24, 1964, Ser. No. 354,270
Claims priority, application Switzerland, Mar. 28, 1963, 3,964/63
5 Claims. (Cl. 200—148)

The present invention relates to electrical circuit breakers, isolators and similar switching devices utilizing a compressed gas and wherein this gas flows in a closed circuit between high and low pressure tanks.

With circuit breakers and apparatus in a completely or partly metal-clad plant, which are operated with a pressure gas of high electrical strength, for instance $SF_6$, the gas is supplied in a closed circuit. This necessitates two pressure gas systems with different gas pressures.

For the various purposes for which the gas is provided—for insulation, as arc extinguishing, operating and cooling medium, etc.—it is an advantage to use a pressure gas distribution system in which the gas consumption is regulated in such a way that the pressure difference between the pressure gas systems is kept approximately constant but the absolute pressure in the systems varies as a function of the gas temperature.

Such systems have the disadvantage that the compressor is directly controlled simultaneously by both pressure gas systems. As a result, each switching operation and also a change in pressure due to temperature differences causes a manipulation of the compressor. Moreover, the compressor must be capable of renewing the entire amount of gas which has been consumed within a very short time, for instance not more than 15 seconds, in the case of circuit breakers. As a consequence large and expensive compressors have to be provided, especially for installations having a centrally arranged compressor.

The present invention avoids these disadvantages and it is thus possible to use compressors having a smaller output and producing less noise.

More particularly, the invention concerns an arrangement for circuit breakers, isolators, and the like, which have gas chambers. At least one chamber is provided for a high pressure and one chamber for a low pressure, whereby by means of a pressure-difference meter the gas pressure difference between the chambers is supervised and maintained by a compressor which produces the pressure difference.

According to the invention the gas chambers are connectable to the high and low pressure chambers of a double reservoir by way of transfer valves and these gas chambers are also directly interconnectable by means of an interconnecting valve, the transfer valves and also the interconnecting valve being controlled by means of the pressure difference meter in such a way that when the pressure difference decreases, the transfer valves are open temporarily, and when the pressure difference increases, the interconnecting valve is opened temporarily. The compressor is connected between the high and low pressure chambers of the double reservoir and turns on automatically whenever the gas pressure within the reservoir falls below a desired level.

The invention is now explained by means of some constructional examples.

The drawing shows in FIG. 1 the basic arrangement according to the invention with a few circuit breakers.

FIG. 2 shows an arrangement with numerous circuit breakers and other apparatus belonging to a switchgear plant.

In FIG. 1 of the drawing 1, two circuit breakers are designated 1 and 2. Each circuit breaker is provided with gas chambers. Chambers 1a, 2a, 3a are for high pressure and chambers 1b, 2b, 3b for low pressure. The high and low pressure chambers are connected by way of pipes 4a, 4b to a pressure difference meter 5. A diaphragm 5c separates the two pressure chambers in meter 5 and these chambers are connected to pipes 4a and 4b respectively by means of pipes 5d and 5e. By means of the latter, the gas pressure difference between the high and low pressure chambers is measured and supervised.

According to the invention, the gas chambers of the circuit breakers are connected by way of extensions of the pipes 4a and 4b and transfer valves 6a and 6b respectively to the high pressure chamber 7a and the low pressure chamber 7b of a double reservoir 7. In the same way, the gas chambers of the circuit breakers are also interconnected by means of a valve 8 for effecting a reduction in the pressure difference which exists as between the high and low pressure gas chambers of the circuit breakers. Valve 8 controls gas flow between pipe lines 4a, 4b and hence also between gas chambers 1a to 3a and 1b to 3b by means of a pipe line 8b which interconnects pipe lines 4a, 4b at a point between the transfer valves and the gas chambers of the circuit breakers, thus providing a direct communication between these chambers when valve 8 is open. The transfer valves 6a, 6b as well as the pressure difference reduction valve 8 are controlled electro-magnetically by means of magnets 6c and 8a by way of switch contacts 5a. The switch contacts 5a are controlled by the pressure diaphragm in the pressure difference meter. If the pressure difference in the gas chambers of the circuit breaker is too low, the contacts 5a move towards the left and actuate the magnets 6c. The transfer valves 6a and 6b are thus opened and gas flows from the high pressure chamber 7a into the gas chambers 1a to 3a and from the gas chambers 1b to 3b into the low pressure chamber 7b. If the pressure difference is too large, the contacts will move to the right and actuate the magnet 8a. This causes the pressure difference valve 8 to open and reduce this difference in pressure.

The high and low pressure chambers of the double reservoir are also connected to the compressor 9. This serves to restore the pressure difference between the high and low pressure chambers when necessary. The compressor is switched on by means of switch 18 which is actuated by the gas pressure meter 19 when the gas pressure in the double reservoir 7 drops. It is expedient to connect the pressure meter to the high pressure chamber.

It is to be expected that gas escapes from the system due to leakage. The gas volume in the chambers is maintained from a compressed gas cylinder 12. Connection to the latter is established by a magnetic valve 13 which opens when the gas density in the low pressure line 4a decreases and drops below a certain value which is supervised by the gas density meter 17 and which closes again when the desired gas density has been restored.

The arrangement has also some manually operated stop valves 11. These enable the individual chambers to be disconnected in the case of a disturbance or when undertaking an overhaul. When a switching operation is undertaken with one of the circuit breakers 1, 2, 3 the pressure in the high pressure chamber of the appertaining breaker and in pipe 4a decreases. The pressure difference meter 5 thus comes into operation and opens temporarily both magnetic valves 6a and 6b, whereupon gas flows from the high pressure chamber 7a of the double reservoir into the high pressure chamber of the circuit breaker and out of the corresponding low pressure chamber and through pipe 4b into the low pressure chamber 7b of the double reservoir 7. When the necessary pressure difference has been restored again, the transfer valves 6a and 6b are closed by the pressure-difference meter 5.

If for instance due to a rise in temperature, the pressure in the high pressure system increases relatively more than in the low pressure system, the pressure difference thus also increases and therefore the pressure difference valve 8 is opened temporarily by the pressure difference meter 5 until the correct pressure difference is attained again. When, however, the pressure in the high pressure system drops, for instance due to a temperature decrease, then transfer valves 6a and 6b are opened by means of the pressure difference meter 5 and magnets 6c until the required pressure difference is reached again due to gas being supplied from the double reservoir. When the pressure however decreases due to a defect, a spring 5b in the pressure difference meter 5 presses the contact rod further towards the left whereby the current is again interrupted by the magnets 6c and valves 6a and 6b reclose. At the same time a signal horn is actuated.

In the plant which has been described all the power circuit breakers form a common unit, where the gas pressure is maintained from a double reservoir. With multi-unit installations it is expedient to provide each unit with a double reservoir as already described and furthermore to supply all the double reservoirs from a further common storage tank. Such an installation is shown in FIG. 2, where 1, 2, 3 are the circuit breakers of the first unit, and 10, 20, 30 those of the second unit. Further units can be connected to the existing ones. Each unit has its own double reservoir 7, 70 respectively. Each double reservoir is in communication by way of a pipe system 80 with a common storage tank 77. This tank also has a high and a low pressure chamber (77a and 77b). The necessary gas pressure difference is maintained by a compressor 9 which is always connected to both pressure chambers. The compressor is operated with the aid of the pressure meters 19a and 19b which are each connected to a gas pressure chamber of the storage tank. The gas pressures which are maintained are higher in 77a and lower in 77b than in the corresponding pressure chambers 7 and 70, this being achieved by means of the non-return valves 34.

The advantage of using a storage tank for the entire installation in conjunction with a double reservoir in each unit is that the double reservoirs can be located next to their circuit breakers, so that the response time and filling time for the circuit breakers is reduced to a minimum. The storage tank can then be located in a central position some distance away from the breakers. Furthermore the individual double reservoirs can be refilled within any convenient time.

Any gas losses due to leakage can be compensated by means of pressure gas supplied from the storage cylinder 12 which is connected by a magnetic valve to the low pressure pipes of the individual units.

In the pipes leading to the pressure gas chambers there are stop valves 11 and non-return valves which enable individual chambers and circuit breakers to be disconnected without interfering with the operation of the plant.

A gas circulating system is provided for heating the pressure gas, the pressure chambers of the circuit breakers and the storage tanks which are at a higher pressure being included in this system. The high pressure chambers 1a, 2a, 3a and the high pressure storage tanks 7a, 77a are connected by way of non-return valves 29 and 30 to a pipe distribution system 21. This system contains stop valves 23 to prevent pressure surges, a circulating pump 25, and an electrical heating device 27. The heated gas is passed back again by way of non-return valves 32 to the high pressure chambers.

The connecting pipe 4a is provided with non-return valves 33 so as to avoid any mutual interchange of gas between the high pressure chambers of the circuit breakers.

The transfer valves 6a, 6b and the valve 8 for reducing the pressure difference can also be controlled from the pressure difference meter 5 by mechanical means, for instance compressed air servomotors.

In conclusion, while I have illustrated preferred embodiments of the invention, it is to be understood that these may be departed from, however, in structure and arrangement without departing from the spirit and scope of the invention as defined in the appended claims.

I claim:

1. In an electrical circuit breaker system operating on a closed gas circuit the combination comprising a circuit breaker having separate high pressure and low pressure gas chambers between which the gas flows when the circuit breaker contacts are opened, a double gas reservoir having a high pressure and low pressure gas chambers, a compressor connected between said high and low pressure chambers of said double reservoir, pipe lines connecting said high and low pressure chambers of said reservoir with said high and low pressure chambers of said circuit breaker, transfer valve means in said pipe lines for controlling gas flow between said reservoir chambers and said circuit breaker chambers, pipe line means directly interconnecting said high and low pressure chambers of said circuit breaker, switch chamber interconnecting valve means interposed in and controlling gas flow through said pipe line means which directly interconnect said high and low pressure chambers of said circuit breaker, a pressure difference meter producing an output variable with the difference in gas pressure in said high and low pressure chambers of said circuit breaker, and means responsive to the output from said pressure difference meter for controlling operation of said transfer valve means and said switch chamber interconnecting valve means such that when said pressure difference decreases, said transfer valve means open temporarily to establish gas flow from said double reservoir through said pipe lines to said high and low pressure chambers of said circuit breaker, and when said pressure difference increases, said switch chamber interconnecting valve means is opened temporarily to establish direct communication between said high and low pressure chambers of said circuit breaker.

2. A circuit breaker system as defined in claim 1 wherein said means responsive to the output from said pressure difference meter for controlling said transfer and switch chamber interconnecting valve means includes electromagnetic means.

3. A circuit breaker system as defined in claim 1 wherein said means responsive to the output from said pressure difference meter for controlling said transfer and switch chamber interconnecting valve means is constituted by a direct mechanical connection therebetween.

4. A circuit breaker system as defined in claim 1 and which further includes a pressure gas cylinder and an auxiliary pipe line therefrom containing a control valve and which leads to the pipe line communicating with said low pressure chamber of said circuit breaker for maintaining the gas.

5. A circuit breaker system including a plurality of circuit breaker units each as defined in claim 1, there being provided a common gas storage tank and the double chamber reservoirs of the plurality of circuit breaker units being connected to said common gas storage tank, and there being a single compressor common to all units and connected to said common storage tank.

References Cited by the Examiner
UNITED STATES PATENTS 2,955,182  10/1960  Caswell et al. _____ 200—148

FOREIGN PATENTS 855,933  1/1962  Great Britain.

ROBERT K. SCHAEFER, *Primary Examiner.*

KATHLEEN H. CLAFFY, *Examiner.*

P. E. CRAWFORD, *Assistant Examiner.*